(12) United States Patent
Morita

(10) Patent No.: US 10,252,765 B2
(45) Date of Patent: Apr. 9, 2019

(54) HANDLE ATTACHMENT AND HANDLE OF TIME TRIAL BIKE

(71) Applicant: Kei Morita, Saitama (JP)

(72) Inventor: Kei Morita, Saitama (JP)

(*) Notice: Subject to any disclaimer, the term of this patent is extended or adjusted under 35 U.S.C. 154(b) by 0 days.

(21) Appl. No.: 16/077,250

(22) PCT Filed: Mar. 2, 2017

(86) PCT No.: PCT/JP2017/008226
§ 371 (c)(1),
(2) Date: Aug. 10, 2018

(87) PCT Pub. No.: WO2017/159375
PCT Pub. Date: Sep. 21, 2017

(65) Prior Publication Data
US 2019/0047656 A1    Feb. 14, 2019

(30) Foreign Application Priority Data

Mar. 17, 2016 (JP) .................. 2016-053476

(51) Int. Cl.
*B62K 21/12* (2006.01)
*B62K 21/16* (2006.01)

(52) U.S. Cl.
CPC ............ *B62K 21/125* (2013.01); *B62K 21/16* (2013.01)

(58) Field of Classification Search
CPC ...... B62K 21/12; B62K 21/125; B62K 21/26; B62K 19/40; B62K 19/38; B62K 23/06; B62K 23/02; Y10T 74/20822; Y10T 74/20828; Y10T 74/2078; B62M 25/045; B62M 25/04; B62M 25/02
See application file for complete search history.

(56) References Cited

U.S. PATENT DOCUMENTS

| | | | | |
|---|---|---|---|---|
| 4,445,396 A | * | 5/1984 | Shimano | ............... B62K 21/12 74/551.1 |
| 4,477,865 A | * | 10/1984 | Tsuyama | ................... B62J 6/00 248/230.7 |
| 4,873,886 A | * | 10/1989 | Renner | ............... B62K 21/125 74/551.8 |
| 5,154,095 A | | 10/1992 | Giard, Jr. | |
| 5,265,496 A | * | 11/1993 | Townsend | ............ B62K 21/125 403/234 |
| 5,390,564 A | * | 2/1995 | Klieber | ................. B62K 21/12 74/551.1 |
| 2007/0175292 A1 | | 8/2007 | Nicol | |
| 2009/0095116 A1 | | 4/2009 | Barnes et al. | |

(Continued)

FOREIGN PATENT DOCUMENTS

JP    2008518826 A    6/2008

*Primary Examiner* — Richard W Ridley
*Assistant Examiner* — Brian J McGovern
(74) *Attorney, Agent, or Firm* — IP Business Solutions, LLC

(57) ABSTRACT

A handle attachment of the present invention is attached to a bullhorn handle of a time trial bike equipped with downhill bars, armrests and bullhorn handles. The handle attachment includes a locking part attached to the vicinity of the tip end of the bullhorn handle. Moreover, the locking part has a wall surface portion protruding outward from the surface of the bullhorn handle and forming a wall surface.

4 Claims, 3 Drawing Sheets

(56) References Cited

U.S. PATENT DOCUMENTS

2011/0126664 A1* 6/2011 O'Reilly .............. B62K 21/125
 74/551.9
2012/0001402 A1 1/2012 Weber et al.
2015/0145230 A1 5/2015 Poole
2017/0166280 A1* 6/2017 Yang ...................... B62K 21/12

* cited by examiner

HANDLE ATTACHMENT AND HANDLE OF TIME TRIAL BIKE

TECHNICAL FIELD

The present invention relates to a handle attachment of a time trial bike, and specifically, relates to a handle attachment attached to a bullhorn handle of a time trial bike. Moreover, the present invention relates to a handle of a time trial bike.

BACKGROUND ART

In a time trial competition of a bicycle road race and a bike part of a triathlon, a bicycle called a time trial bike is used. Especially for reduction of air resistance, such a time trial bike is equipped with a handle of a special structure as shown in Patent Document 1. For example, as shown in FIG. 1, a handle of a time trial bike has a structure with four handlebars protruding forward.

To be specific, the handle of the time trial bike has two downhill bars extending forward in the vicinity of the center of the handle and has armrests for placing arms in the vicinity of the bases of the downhill bars. Moreover, the handle of the time trial bike has two bullhorn handles outside the respective downhill bars.

To the tip end of the downhill bar, a shift lever is attached. The driver grips the downhill bars with his/her arms placed on the armrests, which allows the driver to run with smaller air resistance. Moreover, to the tip end of the bullhorn handle, a brake lever is attached. The driver grips the bullhorn handles particularly when cornering, standing to pedal, or the like.

Patent Document 1: Japanese Translation of PCT International Application Publication No. JP-T 2008-518826

However, because the bullhorn handle described above is formed with its longitudinal direction in the traveling direction of the time trial bike (heading forward), there arises a problem that a state in which the driver grips the handles cannot be stable. In particular, when the driver brakes, the driver's weight gets forward by inertia, and the driver's hands holding the bullhorn handles are easy to move toward the tip ends, so that there is a fear that the hands get off the handles.

SUMMARY

Accordingly, an object of the present invention is to solve a problem that a state in which the bullhorn handles are gripped cannot be stable.

A handle attachment of a time trial bike as an aspect of the present invention is a handle attachment of a time trial bike equipped with two downhill bars located in a center of a handle and extending forward, two armrests mounted on rear end sides of the respective downhill bars and two bullhorn handles located outside the respective downhill bars and extending forward. The handle attachment is attached to the bullhorn handle. The handle attachment includes a locking part attached to a vicinity of a tip end of the bullhorn handle, and the locking part has a wall surface portion protruding outward from a surface of the bullhorn handle and forming a wall surface.

In the handle attachment: the wall surface portion of the locking part protrudes upward from an upper surface of the bullhorn handle and is formed with the wall surface facing a rear end side of the bullhorn handle; and the locking part has a curved surface portion on an opposite side to a side of wall surface portion, that is, on a side of the tip end of the bullhorn handle, the curved surface portion being formed of a curved surface such that a height of the locking part gradually decreases toward the tip end of the bullhorn handle.

Moreover, in the handle attachment: the locking part has a reinforcing plate member inside, the reinforcing plate member being bent at substantially right angles; one reinforcing plate with respect to a bent portion of the reinforcing plate member is placed along the upper surface of the bullhorn handle; and other reinforcing plate with respect to the bent portion of the reinforcing plate member is placed along the wall surface portion.

Moreover, in the handle attachment: a support member is placed between the one reinforcing plate and the other reinforcing plate of the reinforcing plate member; the one reinforcing plate has a protruding portion in a vicinity of an opposite end portion to the bent portion of the reinforcing plate member, the protruding portion protruding from the one reinforcing plate and abutting on the support member; and the other reinforcing plate has a cutout piece formed by cutting out the other reinforcing plate in a state in which the cutout piece is partly connected to the other reinforcing plate, the cutout piece being bent at a connection point so as to abut on the support member.

Moreover, in the handle attachment, the other reinforcing plate has two cutout pieces respectively formed so as to be partly connected to the other reinforcing plate, and the two cutout pieces is bent at respective connection points so that tip ends of the cutout pieces abut on each other and also abut on the support member.

Further, a handle of a time trial bike as another aspect of the present invention is a handle of a time trial bike equipped with two downhill bars located in a center of the handle and extending forward, two armrests mounted on rear end sides of the respective downhill bars and two bullhorn handles located outside the respective downhill bars and extending forward. The bullhorn handle includes a locking part in a vicinity of a tip end of the bullhorn handle, the locking part having a wall surface portion protruding outward from a surface of the bullhorn handle and forming a wall surface.

In the handle: the wall surface portion of the locking part protrudes upward from an upper surface of the bullhorn handle and is formed with the wall surface facing a rear end side of the bullhorn handle; and the locking part has a curved surface portion on an opposite side to a side of wall surface portion, that is, on a side of the tip end of the bullhorn handle, the curved surface portion being formed of a curved surface such that a height of the locking part gradually decreases toward the tip end of the bullhorn handle.

With the configurations described above, the present invention makes it possible to, with use of a wall surface portion of a locking part attached to the tip end of a bullhorn handle, prevent the hands of the driver gripping the bullhorn handles from moving toward the tip ends. As a result, a state in which the bullhorn handles are gripped is stabilized, and operation of the time trial bike by the driver is stabilized and facilitated.

EXAMPLE EMBODIMENTS

Figure 1:
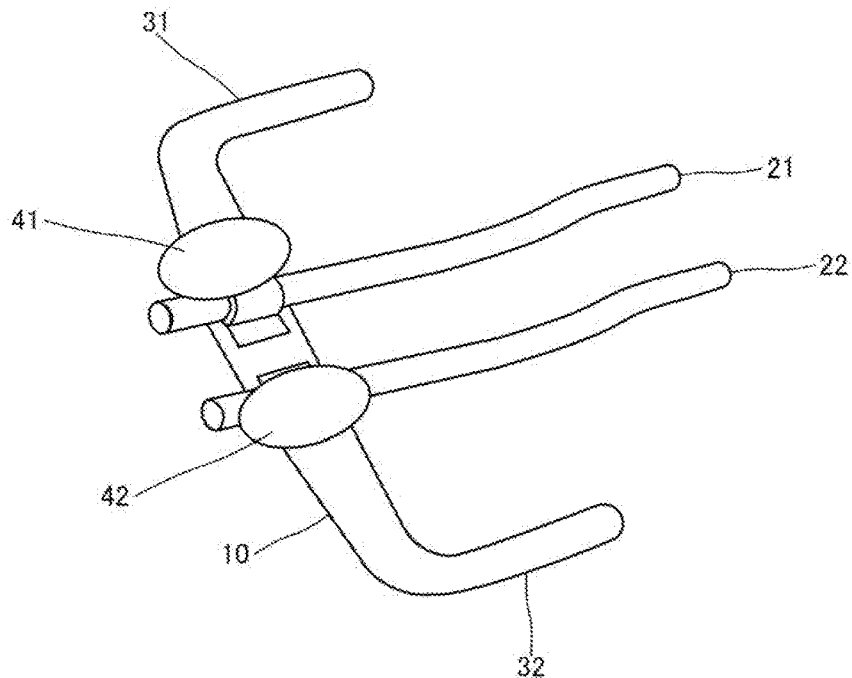
FIG. 1 is a view showing a configuration of a handle of a time trial bike.
Figure 2:
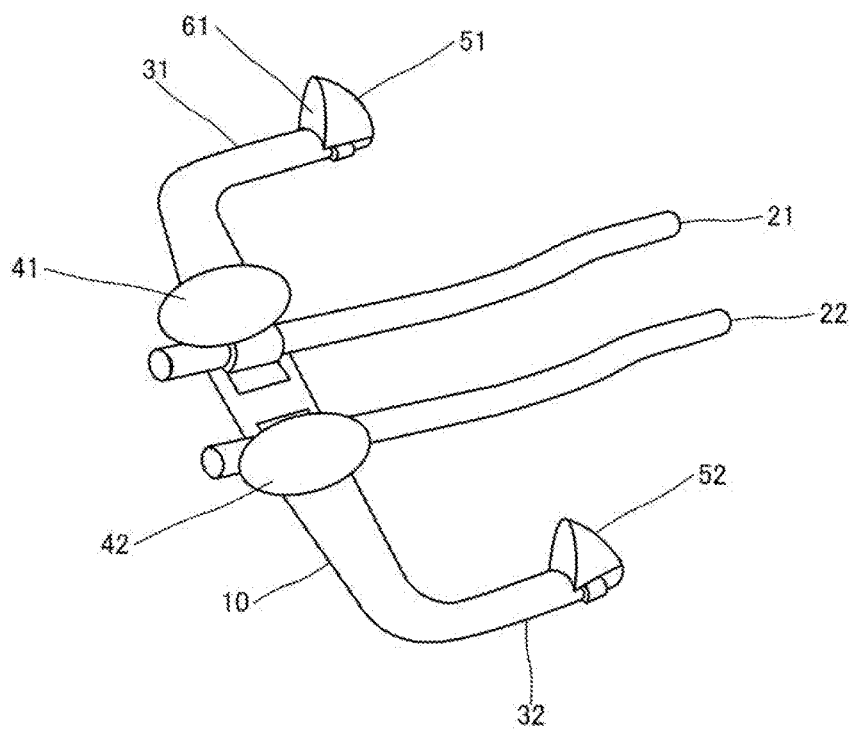
FIG. 2 is a view showing a configuration of a handle of a time trial bike according to the present invention.
Figure 3:
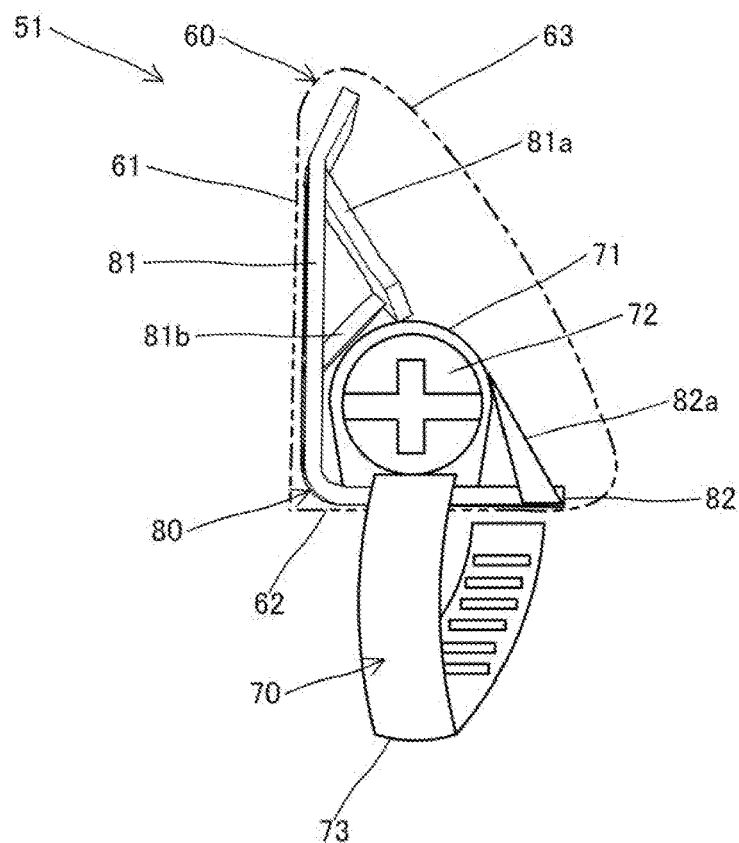
FIG. 3 is a view showing a configuration of an attachment attached to a bullhorn handle disclosed in FIG. 1.

An example embodiment of the present invention will be described with reference to FIGS. 1 to 4. FIGS. 1 and 2 are views each showing a whole configuration of a handle of a time trial bike. FIGS. 3 and 4 are views each showing a configuration of an attachment attached to a bullhorn handle.

FIG. 1 shows a configuration of a general time trial bike handle (also referred to as the "handle" hereinafter). As shown in FIG. 1, the handle basically has a structure including four handlebars (downhill bars 21 and 22, and bullhorn handles 31 and 32) extending in the forward direction of the time trial bike. Hereinafter, the configuration of the handle will be described in detail.

In the following description, the traveling direction of the time trial bike will be referred to as forward, and the end portions of the handlebars 21, 22, 31 and 32 facing forward will be referred to as the tip ends. On the contrary, the opposite direction to the traveling direction of the time trial bike will be referred to as backward, and the end portions of the handlebars 21, 22, 31 and 32 facing backward will be referred to as rear ends.

To be specific, the handle includes a handle base part 10 connected to a time trial bike body frame (not shown in the drawings). The handle base part 10 is made of a plate-like member extending in a direction perpendicular to the traveling direction of the time trial bike.

The handle includes two downhill bars 21 and 22 whose rear end sides are fixed in the vicinity of the center of the handle itself, namely, in the vicinity of the center of the handle base part 10 and which extend forward. The downhill bars 21 and 22 are formed of substantially linear rod-shaped bodies having circular cross sections. Although not shown in the drawings, shift levers are attached to the tip ends of the downhill bars 21 and 22 that are end portions in the traveling direction of the time trial bike.

Further, the handle includes armrests 41 and 42 fixedly mounted in the vicinity of the rear ends of the downhill bars 21 and 22, namely, in the vicinity of the center of the handle base part 10. The armrests 41 and 42 are mounted above the downhill bars 21 and 22 so as to correspond the two downhill bars 21 and 22, respectively. Consequently, the driver of the time trial bike can grip the downhill bars 21 and 22 in the vicinity of the rear ends thereof by hands with his/her arms placed on the armrests 41 and 42. By running in this state, air resistance can be reduced.

Furthermore, the handle includes two bullhorn handles 31 and 32 extending forward outside the respective downhill bars 21 and 22, namely, on the left side and right side of the downhill bars 21 and 22 for the driver. To be specific, the bullhorn handles 31 and 32 are formed of substantially linear rod-like bodies having circular cross sections formed so as to extend forward from both ends of the handle base part 10, and are formed so as to be shorter than the downhill bars 21 and 22. Although not shown in the drawings, brake levers are attached to the tip ends of the bullhorn handles 31 and 32 that are end portions on the traveling direction side of the time trial bike. The bullhorn handles 31 and 32 are operated by the driver's griping by hands, especially, when cornering, standing to pedal, or the like.

Next, with reference to FIG. 2, a handle attachment of the present invention will be described. As shown in FIG. 2, handle attachments 51 and 52 are respectively attached to the vicinity of the tip ends of the bullhorn handles 51 and 52 described above. The handle attachments 51 and 52 are each mainly configured by an attachment mechanism 70 and a locking part 60. The attachment mechanisms 70 are wound around and fixed to the bullhorn handles 31 and 32, respectively, to fixedly mount the locking parts 60 on the upper surface side of the bullhorn handles 31 and 32.

At this time, the locking parts 60 are attached so as to protrude upward from the upper surfaces of the bullhorn handles 31 and 32. As shown in FIG. 2, substantially planar wall surface portions 61 formed in the locking parts 60 are brought into a state in which their wall surfaces face the rear end sides of the bullhorn handle 31 and 32. That is, the wall surface portions 61 are formed on the upper surface side in the vicinity of the tip ends of the respective bullhorn handles 31 and 32 with the surfaces vertical to the traveling direction of the time trial bike facing in a direction opposite to the traveling direction.

Consequently, in a state in which the driver grips the bullhorn handles 31 and 32, portions between the thumbs and forefingers of his/her hands abut on the wall surface portions 61. Then, for example, even when the weight of the driver is put forward by braking, movement of the hands gripping the bull horn handles 31 and 32 toward the tip ends is locked by the wall surface portions 61. As a result, it is possible to prevent the hands from detaching from the bullhorn handles 31 and 32, a state in which the bullhorn handles are gripped is stabilized, and operation of the time trial bike by the driver is facilitated.

Further, the locking part 60 has a curved surface portion 63 (see FIG. 3) formed of a curved surface or an inclined surface on a side opposite to the wall surface portion 61 side, that is, on the traveling direction side of the time trial bike that is the tip end side of the bullhorn handle 31, 32. The curved surface portion 63 is formed of a curved surface or inclined surface such that the height of the locking part 60 gradually decreases as a distance from the wall surface portion 61 increases, that is, as it goes toward the tip end of the attached bullhorn handle 31, 32. Consequently, during traveling by the time trial bike, the driver receives the air resistance from the front, but since the locking part 60 receives the air at the curved surface portion 63, so that the air resistance can be reduced. The locking part 60 is not limited to the case where the entire surface on the opposite side to the wall surface portion 61 side is formed of a curved surface or an inclined surface, and only a part may be formed with a curved surface or an incline surface. Moreover, the upper end of the locking part 60 may be formed into a curved surface or a planar surface.

Figure 4A:
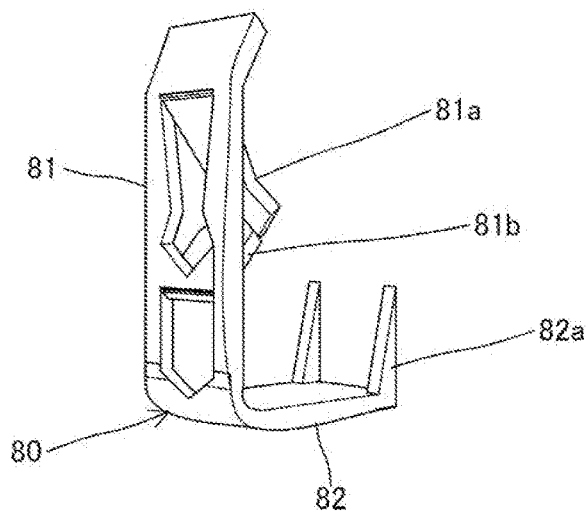
FIG. 4A is a perspective view showing a configuration of a metal plate forming the attachment disclosed in FIG. 3.
Figure 4B:
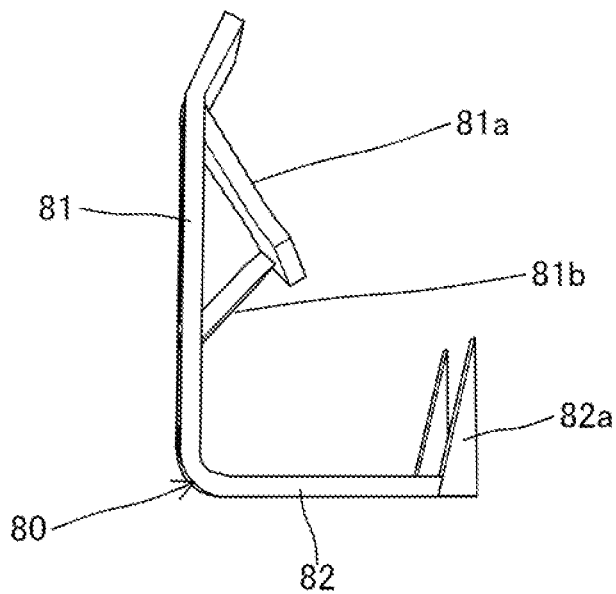
FIG. 4B is a right-side view showing a configuration of a metal plate forming the attachment disclosed in FIG. 3.
Figure 4C:
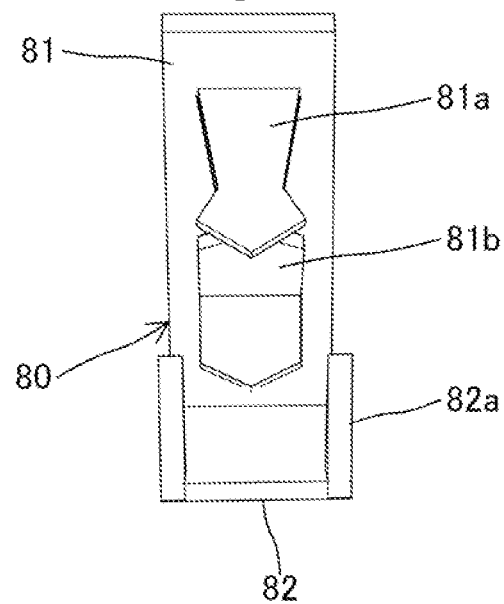
FIG. 4C is a front view showing a configuration of a metal plate forming the attachment disclosed in FIG. 3.

Next, a specific configuration of the abovementioned handle attachment 51 will be described with reference to FIGS. 3 and 4. FIG. 3 is a view showing an internal structure in which a cover member forming the outer shape of the locking part 60 of the handle attachment 51 is removed. FIG. 4 is a perspective view (FIG. 4A), a right-side view (FIG. 4B) and a front view (FIG. 4C) of a metal plate 80 (described later) configuring the locking part 60.

In FIG. 3, a cover member forming the locking part 60, the wall surface portion 61 and the curved surface portion 63 is shown with an imaginary line. For example, the cover member is formed of a flexible resin material at the wall surface portion 61 and a contact surface 62 with the bullhorn handle 31, 32, and the curved surface portion 63 is formed of a hard plastic material. However, the cover member may be made of any material.

As shown in FIG. 3, the handle attachment 51 has, inside the locking part 60, a metal plate 80 serving as a reinforcing plate bent in an L shape and internal mechanisms 71 and 72 that are part of the attachment mechanism 70. The metal plate 80 has a predetermined thickness and is bent at right angles. The metal plate 80 is not necessarily limited to being bent at right angles. The metal plate 80 may be bent at substantially right angles or at other angles. In addition, the reinforcing plate that is the metal plate 80 is not necessarily limited to being made of metal, and it may be formed of any material, for example, a bent plate member made of carbon may be used.

The metal plate 80 has one metal plate portion 82 (one reinforcing plate) and the other metal plate portion 81 (the other reinforcing plate) across a bent portion. The one metal plate portion 82 is arranged along the upper surface of the bullhorn handle 31, 32, and the other metal plate portion 81 is arranged along the wall surface portion 61. Between the one metal plate portion 82 and the other metal plate portion 81, the inner mechanisms 71 and 72 (supporting members) made of metal that are part of the attachment mechanism 70 are arranged. The inner mechanisms 71 and 72 are not necessarily limited to being made of metal and may be made of another material such as carbon.

The internal mechanisms 71 and 72 of the attachment mechanism 70 has a bolt 72 and a support member 71 that surrounds and supports the bolt 72. One end of a band 73 forming the attachment mechanism 70 is connected to the support member 71 and the support member 71 supports the bolt 72 so that the other end of the band 73 can be inserted into the lower portion of the bolt 72. The other end of the band 73 is inserted into the lower portion of the bolt 72 and the support member 71 while the band 73 is wound around the handle 31, 32. By tightening the bolt 72, the support member 71 is lowered, and the other end portion f the band 73 is fixed by the head of the screwed bolt.

The attachment mechanism 70 for attaching the locking part 60 to the bullhorn handle 31, 32 may have any structure. For example, a claw portion in which a groove formed in the band 73 fits is provided in the supporting member 71, and the other end side of the inserted band 73 is fixed by the claw portion. Moreover, for example, the attachment mechanism 70 may be an adhesive tape, and the locking part 60 may be attached to the bullhorn handle 31, 32 with the adhesive tape. In this case, the internal mechanisms 71 and 72 may be placed merely as a reinforcing member between the one metal plate portion 82 and the other metal plate portion 81.

Here, the support member 71 is fixed by the abovementioned metal plate 80. To be specific, the support member 71 is fixed by a protruding portion 82a formed on the one metal portion 82 of the metal plate 80 and cutout pieces 81a and 81b formed on the other metal plate portion 82b.

As shown in FIG. 4, the one metal plate portion 82 has a pair of protruding portions 82a protruding upward from the one metal plate portion 82 itself on both sides in the width direction near the end portion opposite the bent portion of the metal plate 80. As shown in FIG. 3, the pair of protruding portions 82a abut on the support member 71 placed between the one metal plate portion 82 and the other metal portion 81 and are bent so as to press the support member 71 toward the other metal portion 82.

Further, as shown in FIG. 4, the other metal plate portion 81 has two cutout pieces 81a and 81b formed by cutting out the other metal plate portion 81 in a state partly connected to the other metal plate portion 81. The first cutout piece 81a has a connecting portion near the end portion of the other metal plate portion 81, and the second cutout portion 81b has a connecting portion closer to the bent portion than the cutout of the first cutout piece 81. The cutout portions 81a and 81b are each formed by cutting out the lower side from the connecting portion.

The two cutout pieces 81a and 81b are bent at the respective connecting portions so that the vicinities of their respective tip ends abut on each other. In addition to this, the two cutout pieces 81a and 81b are bent at the respective connecting portions so that the vicinities of the respective tip ends abutting each other are further brought into contact with the support member 71. Thus, the two cutout pieces 81a and 81b are configured to press the support member 71 toward the one metal plate portion 81 side.

As described above, since the handle attachment of the present invention is provided with the metal member 80 (reinforcing member) inside the locking part 60, the load applied to the driver's hands griping the bullhorn handles 31 and 32 can be supported stably. Particularly, by making the metal member 80 into an L shape or bringing the protruding portion 82a and the cutout pieces 81a and 81b into contact with the support member 71, the strength of the locking part 60 increases and it is possible to support more stably.

In the above description, the locking part 60 is placed so that the wall surface portion 61 of the locking part 60 protrudes above the bullhorn handle 31, 32. However, the wall surface portion 61 may protrude outside the surface of the bullhorn handle 31, 32 in any direction. For example, the wall surface portion 61 may form a wall surface protruding sideways near the tip end of the bullhorn handle 31, 32 or may form a wall surface protruding all around the bullhorn handle 31, 32.

Further, in the above description, the handle attachments 51 and 52 are configured so that the locking parts 60 can be attached to and detached from the bullhorn handles 31 and 32 by the attachment mechanisms 70. However, the locking parts 60 are not necessarily limited to being attachable or detachable. The locking part 60 described above may be fixedly mounted in the vicinity of the tip end of the bullhorn handle 31, 32 in advance.

Although the present invention has been described with reference to the above example embodiments, the present invention is not limited to the above-described embodiments. Various modifications that can be understood by one skilled in the art can be made within the scope of the present invention in the configuration and details of the present invention.

The present invention is based upon and claims the benefit of priority from Japanese patent application No. 2016-053476, filed on Mar. 17, 2016, the disclosure of which is incorporated herein in its entirety by reference.

DESCRIPTION OF NUMERALS 10 handle base part
21, 22 downhill bar
31, 32 bullhorn handle
41, 42 armrest
51, 52 handle attachment
60 locking part
61 wall surface portion
63 curved surface portion
70 attachment mechanism
71 support member
72 bolt 73 band
80 metal member
81 one metal plate portion
81a, 81b cutout piece
82 the other metal plate portion
82a protruding portion

The invention claimed is:

1. A handle attachment of a time trial bike equipped with two downhill bars located in a center of a handle and extending forward, two armrests, each armrest mounted on a respective rear end side of a respective one of the two downhill bars, two bullhorn handles located outside the two downhill bars and extending forward, the handle attachment being attached to a respective one of the two bullhorn handles, the handle attachment comprising:

a cover covering a reinforcing plate member;

a clamp;

the cover has a wall surface portion protruding upward from an upper surface of the respective one of the two bullhorn handles such that the wall surface portion faces a rear end side of the respective one of the two bullhorn handles;

the cover has a curved surface portion on an opposite side to a side of the wall surface portion, the curved surface portion being formed such that a height of the cover gradually decreases along a direction from the handle toward a distal tip end of the respective one of the two bullhorn handles;

the reinforcing plate member including a first plate portion and a second plate portion, the first and second plate portions extending substantially perpendicular to one another;

the first plate portion extends along the upper surface of the respective one of the two bullhorn handles, and the second plate portion extends along the wall surface portion;

the first plate portion includes a protruding portion, and the second plate portion includes a first cutout piece and a second cutout piece;

the first and second cutout pieces each including a respective distal tip end, the respective distal tip ends of the first and second cutout pieces abutting each other.

2. The handle attachment of the time trial bike according to claim 1, wherein:

the clamp is placed between the first plate portion and the second plate portion;

the first and second plate portions are connected by a bent portion;

the protruding portion is located at a distal end of the first plate portion which is located opposite to the bent portion.

3. The handle attachment of the time trial bike according to claim 2, wherein the protruding portion and the respective distal tip ends of the first and second cutout pieces each abuts the clamp.

4. The handle attachment of the time trial bike according to claim 2, wherein the protruding portion includes a first protruding portion separated from a second protruding portion.

* * * * *